F. W. STORCK.
ENVELOP SEALING MACHINE.
APPLICATION FILED MAR. 28, 1918.

1,365,803.

Patented Jan. 18, 1921.
8 SHEETS—SHEET 1.

INVENTOR=
Frederick W. Storck
By Franklin F. Phillips Jr.
HIS ATTORNEY=

F. W. STORCK.
ENVELOP SEALING MACHINE.
APPLICATION FILED MAR. 28, 1918.

1,365,803.

Patented Jan. 18, 1921.
8 SHEETS—SHEET 2.

F. W. STORCK.
ENVELOP SEALING MACHINE.
APPLICATION FILED MAR. 28, 1918.

1,365,803.

Patented Jan. 18, 1921.
8 SHEETS—SHEET 3.

INVENTOR=
Frederick W. Storck
By Franklin F. Phillips, Jr.
HIS ATTORNEY=

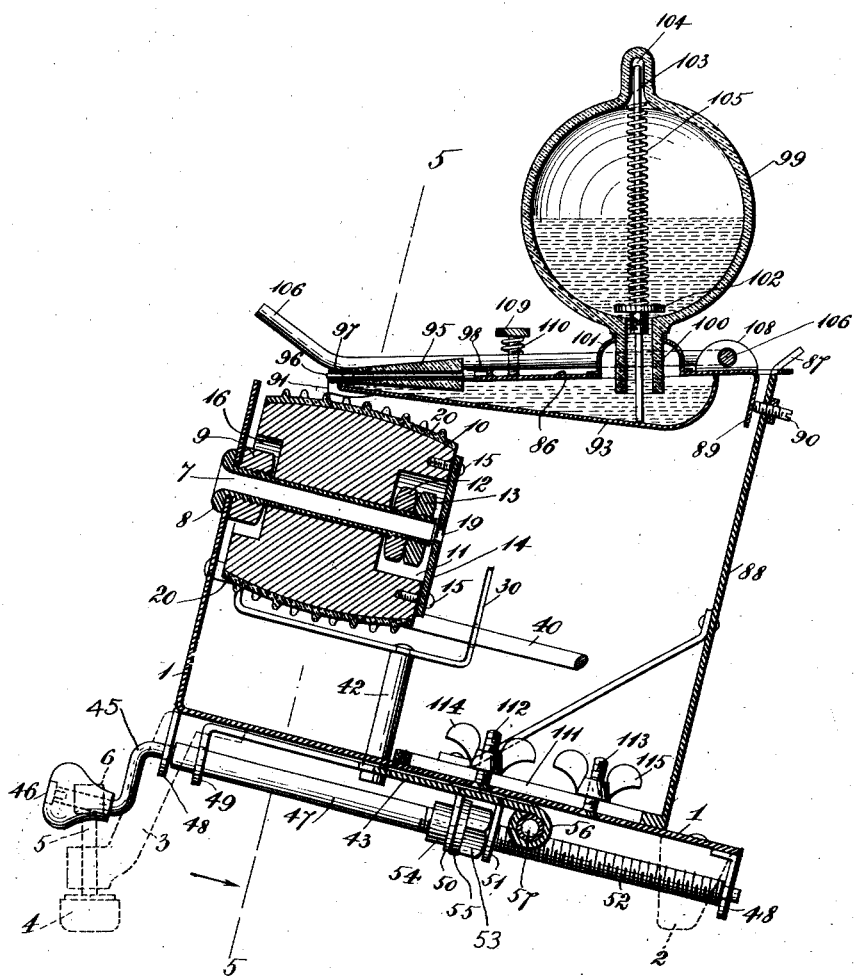

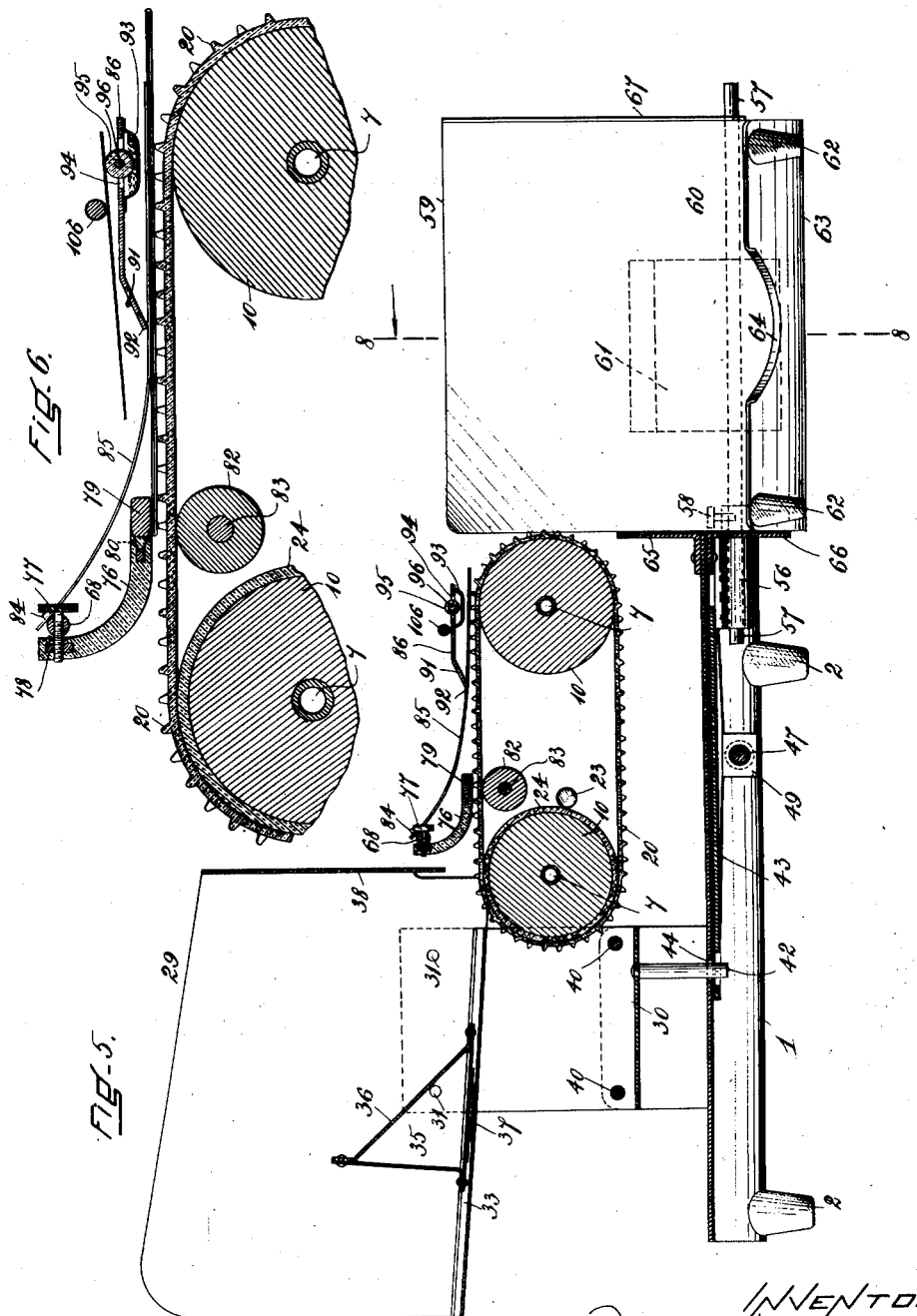

F. W. STORCK.
ENVELOP SEALING MACHINE.
APPLICATION FILED MAR. 28, 1918.
1,365,803.
Patented Jan. 18, 1921.
8 SHEETS—SHEET 6.
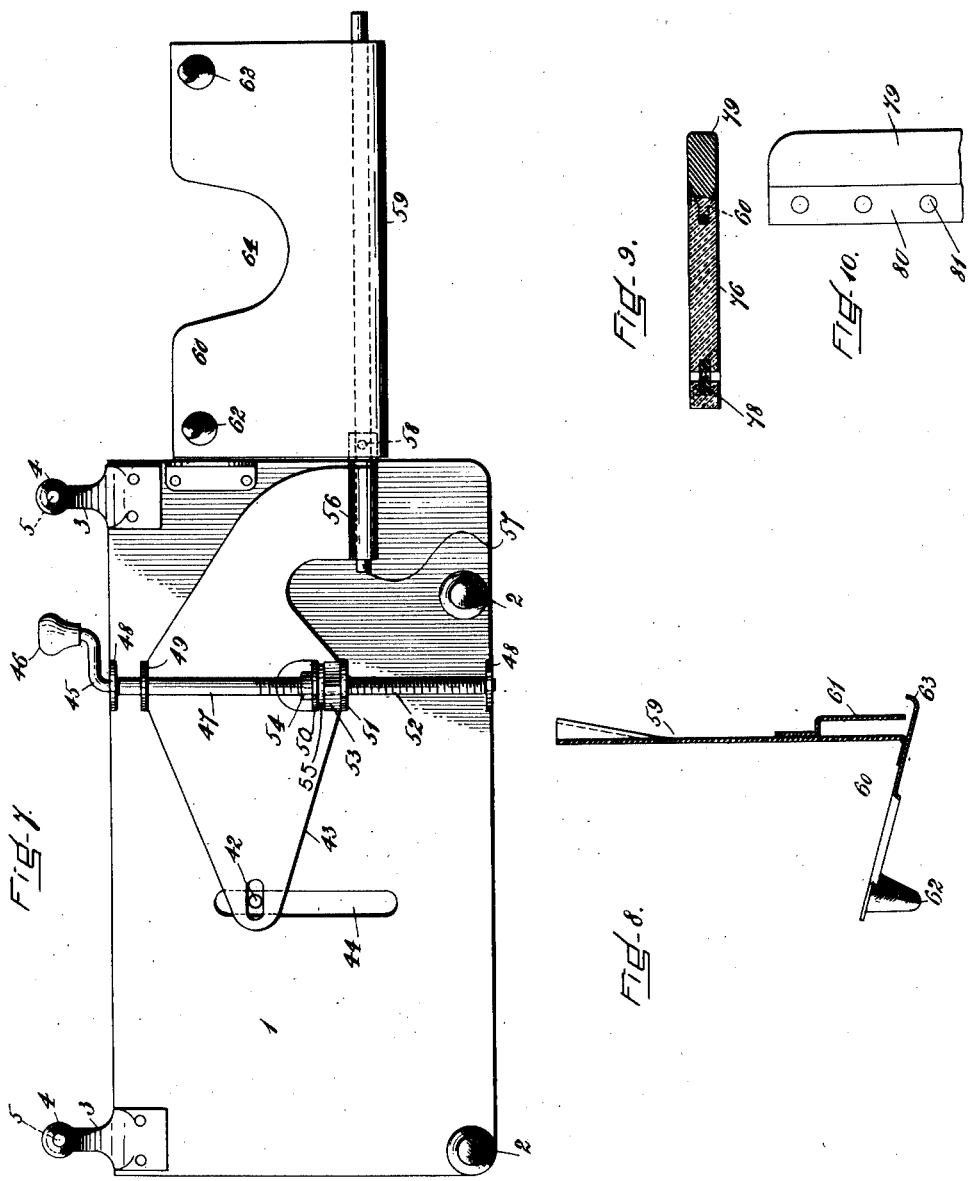

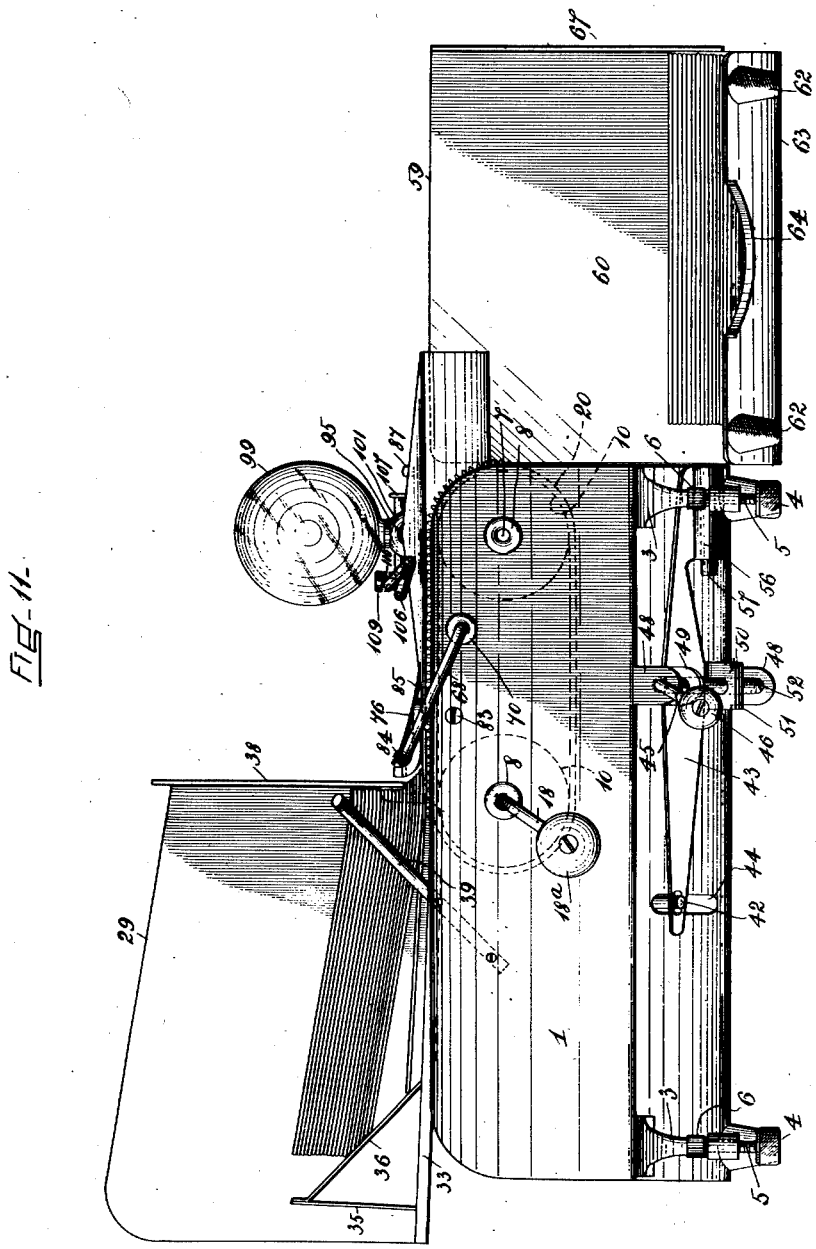

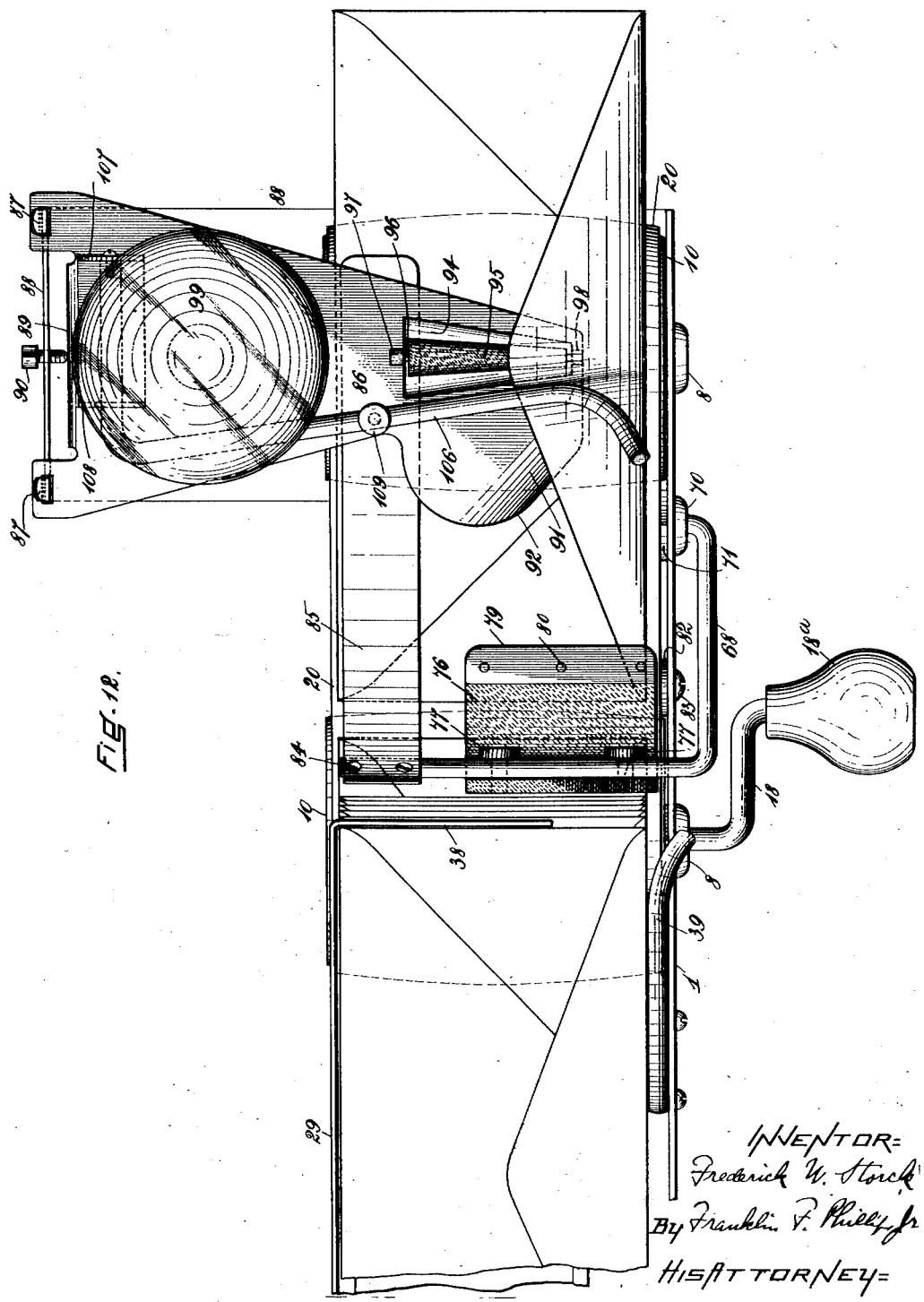

UNITED STATES PATENT OFFICE.

FREDERICK W. STORCK, OF SOMERVILLE, MASSACHUSETTS, ASSIGNOR TO STANDARD ENVELOPE SEALER MANUFACTURING COMPANY, A CORPORATION OF MASSACHUSETTS.

ENVELOP-SEALING MACHINE.

1,365,803.  Specification of Letters Patent.  Patented Jan. 18, 1921.

Application filed March 28, 1918. Serial No. 225,301.

*To all whom it may concern:*

Be it known that I, FREDERICK W. STORCK, a citizen of the United States, residing at Somerville, in the county of Middlesex and Commonwealth of Massachusetts, have invented certain new and useful Improvements in Envelop-Sealing Machines, of which the following is a specification.

My invention relates to that type of envelop sealing machine in which envelops, the flaps of which are in normal, folded position, may be fed from a stack successively into contact with means for raising the flaps and moistening the gum thereon.

It has been the special object of my invention to make a machine which shall, while embodying the essential principles of the machine shown in my Patent No. 1,194,568 of August 15, 1916, also embody certain refinements and improvements hereinafter set forth and claimed designed to afford means for insuring the forwarding of the envelops and their maintenance in proper alinement for the subsequent operation thereon of flap opening, moistening and sealing means, in a manner whereby dislocation of the flap by changing the normal crease or fold thereof, incidental to the feeding operation, is prevented so that the flap will not subsequently be subjected to imperfect contact with the moistening means, and moreover will not because of a new and hence unyielding fold resist the subsequent sealing influence of means provided to effect sealing; also to afford means for making my machine easily adjustable for operation upon envelops of different widths and bulk of contents; and to provide means for regulating the amount of moisture supplied to the gummed edges of the flaps.

It has been the further special object of my invention to eliminate, for reasons hereinafter expressed, the sealing plate or sealing rollers heretofore commonly employed in the art by affording means whereby the sealing of the flaps of the envelops may be affected by the weight of the envelops themselves in a stack, in which they are piled in the course of the operation of the machine, with their flaps moistened and yet lying in the normal folded relation with respect to the bodies of the envelops.

My invention may be more readily understood by reference to the accompanying drawings in which—

Fig. 4 is a cross-sectional view on line 4—4 of Fig. 1, viewed in the direction of the arrow.

Fig. 5 is a longitudinal section of the whole machine on line 5—5 of Fig. 4, viewed in the direction of the arrow.

Fig. 6 is an enlargement of certain detail of Fig. 5 showing the envelop feeding and flap-raising means in operative position in relation to an envelop.

Fig. 7 is a bottom view of my machine.

Fig. 8 is an end view, partly in section, of the receiving hopper.

Fig. 9 shows the rubber stripper in cross-section.

Fig. 10 is view of the metallic tip of the stripper.

Fig. 11 is a side view of the machine, the nearer side being slightly elevated so as to show the base of the machine, there being shown envelops in operative relation to the machine.

Fig. 12 is a top view showing envelops in operative relation to the machine.

Figure 1:
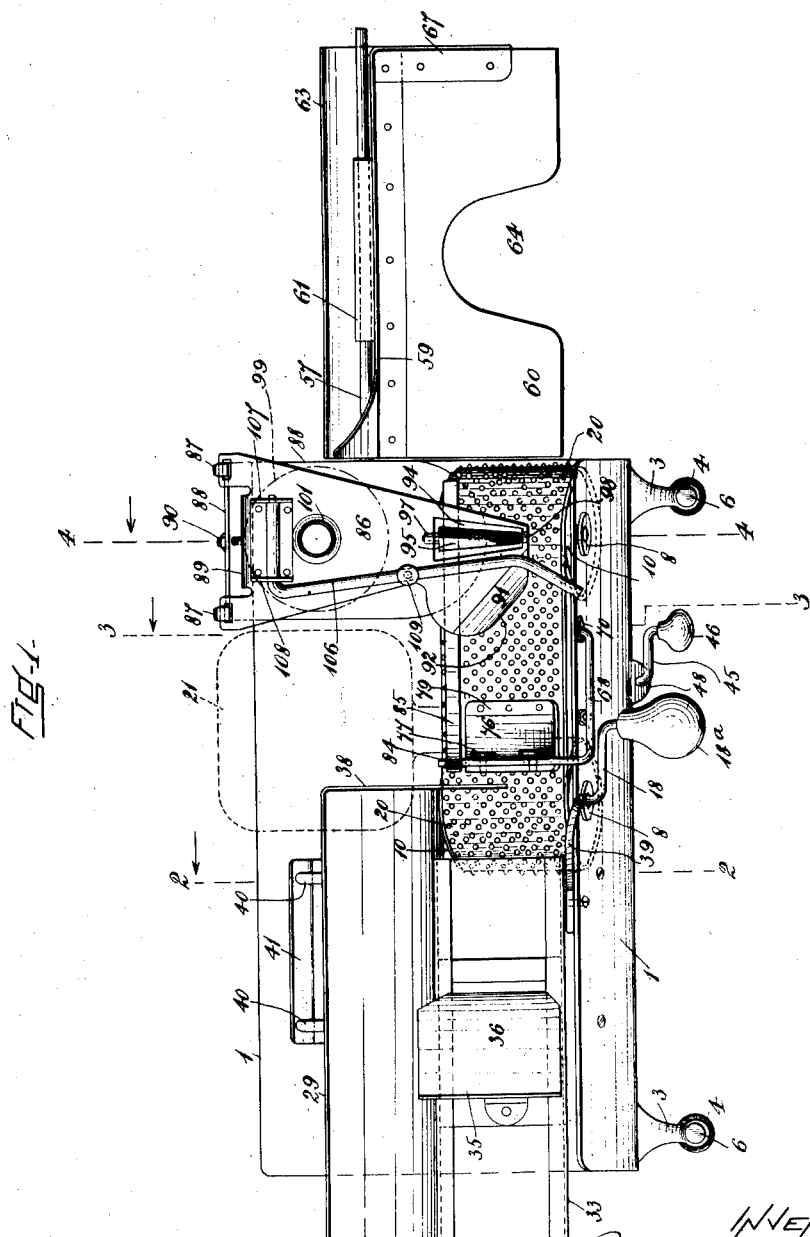
Figure 1 is a top view of the machine.

Referring now more specifically to the drawings, in which like reference numbers indicate like parts, 1 is a frame preferably stamped from a single piece of thin sheet metal. This frame 1 rests, on one side upon rubber feet 2, its other, and more elevated side, resting upon legs 3 on which are mounted feet 4 which have fast thereon threaded posts 5 passing through threaded holes in legs 3. Posts 5 have thumb knobs 6 on the tops thereof so that by turning said posts 5 said legs 3 may be elevated to a greater or lesser degree for a purpose to be hereinafter specified.

It will be observed that the front side of the frame 1 slants inwardly and passing through said frame are two hollow shafts 7 the outer ends of which have flanges 8 to engage the outer surface of the frame 1. These shafts 7 are each held in place by nuts 9 (see Fig. 4) which are screwed upon the threads of portions thereof next the inside of frame 1. Upon shafts 7 are rotatably mounted rollers 10 which are of greatest diameter near their central portions, thus being barrel-shaped. A recess 11 in the inner end of each roller permits nut 12 and locking nut 13 to be screwed upon the end of each shaft 7 and the ends of the shafts and these nuts to be inclosed by plates 14 which are fastened by screws 15 to the inner ends of said rollers 10. The opposite ends of each of the rollers 10 also have recesses 16 which permit them to embrace nuts 9 and extend close to the inside of frame 1. Either roller 10 may be revolved by inserting through the hollow interior of shaft 7 the crank 18 which is provided at one end with the handle 18ª, the other end being threaded to engage and screw tightly into a threaded hole 19 in the center of plate 14 which is attached to the roller 10.

The two rollers 10 are connected by an endless feed-belt 20 made of rubber and provided with a knobbed outer surface whereby it may better engage the envelops to be fed thereon. The barrel shaped construction of the rollers serves to keep the belt in proper alinement and to retain it securely in place.

An electric motor 21 is detachably mounted on the base of frame 1 by means of thumb nut 22 screwed upon a threaded post 22ª which is mounted on the base of frame 1 and passes through the base of the motor casing. The connection thereby formed is a pivot permitting the motor 21 to swing so that its drive shaft 23 which has a knurled surface may be held in firm frictional engagement with the rubber band 24 set in the grooved exterior of the forward roller 10 by means of the tension of coil spring 25 one end of which is fastened to a post 26 in the base of frame 1 and the other end of which is provided with a ring 27 which may be slipped over pin 28 in the casing of motor 21.

Figure 2:
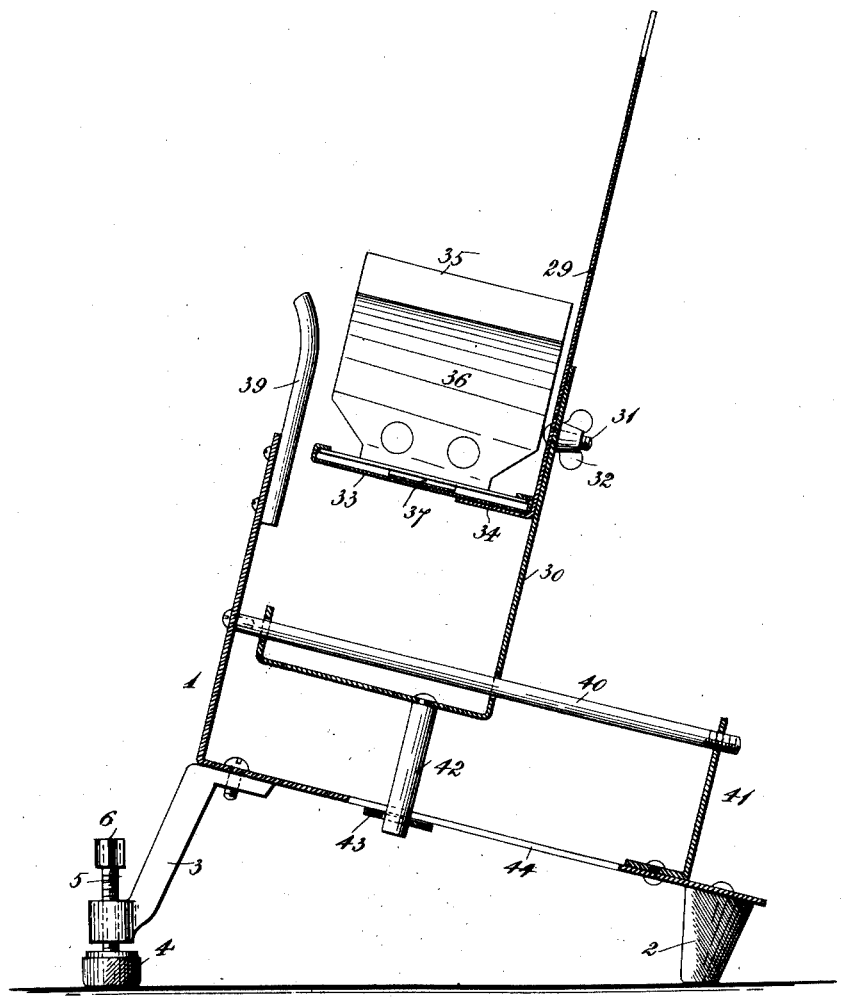
Fig. 2 is a cross-sectional view on line 2—2 of Fig. 1, viewed in the direction of the arrow.

A feed-hopper 29 is fastened to movable bracket 30 by means of screw studs 31 and wing nuts 32. The base 33 of the feed-hopper 29 has inturned flanges 34 (see Fig. 2) which embrace the base of the triangular member 35 which is thus slidably mounted in the feed-hopper. One side of triangular member 35 forms a slanting support 36 (see Fig. 5) for the rearward portion of a stack of envelops that may be placed in the hopper. A leaf spring 37 fastened to the base of the triangular member 35 holds it in frictional engagement with the base 33 of the feed-hopper 29. Thus its position may be quickly and easily changed to conform to the length of envelops to be operated upon so that the envelops will fit between the slanting support 36 and the forward end 38 of the feed-hopper which end extends above the nearer feed-roller 10, there being a space sufficient to permit the passage of envelops between the end 38 of the feed-hopper and the feed-belt 20. An arm 39 fastened to frame 1 serves to retain the stack of envelops in place on the open side of feed-hopper 29.

To adjust the feed-hopper to envelops of varying width the bracket 30 whereon it is mounted is made movable in the following manner: Rods 40 mounted between the side of frame 1 and a bracket 41 fastened to the base of frame 1 (see Fig. 2) pass loosely through holes in opposite sides of the base of bracket 30 so that the bracket is slidably mounted thereon, and a post 42 extending downwardly from the base of bracket 30 causes the bracket 30 and the feed-hopper 29 carried thereby to be actuated laterally by means of the movement of sliding arm 43 which loosely embraces the post 42 beneath the base of frame 1 which has a slot 44 (see Fig. 7) which permits the free movement of post 42. Sliding arm 43 is actuated by crank 45 which is provided with a handle 46 its shaft 47 being mounted on lugs 48 which extend beneath opposite edges of the base of frame 1. Crank shaft 47 passes through holes in lugs 49, 50 and 51 on the sliding arm 43 and the threaded end 52 thereof engages nut 53 mounted between lugs 50 and 51. A sleeve 54 is provided with a flange 55 and passes through the hole in lug 50 and embraces crank shaft 47 and forms a bearing to permit easy sliding of lugs 50 and 51 over the threaded portion of the crank shaft.

The sliding arm 43 has a rolled extremity 56 which embraces rod 57 which is fastened thereto by means of the thumb nut 58 which passes through said rolled extremity 56. This rod 57 passes between the rear of the back wall 59 of the receiving-hopper 60 and a bracket 61 mounted thereon thus engaging the hopper 60 and sliding it backward or forward with the movement of arm 43 upon the rotation of crank shaft 47. It will be observed that the base of receiving-hopper 60 slants rearwardly (see Fig. 8) as the forward side is elevated on rubber toes 62, while the rearward portion is extended to form a support 63. It will also be observed that the base of receiving-hopper 60 is cut away in front at 64 in order that the hand of the operator may embrace the stack of envelops while removing the same. Flanges 65 and 66 mounted on both sides of the base of frame 1 and at right angles thereto form stops to prevent the stack of envelops in receiving-hopper 60 from displacement, thus making another end wall for the hopper 60 which has an end wall 67 in addition to the back wall 59, the front of the hopper nearest the operator being entirely open.

Figure 3:
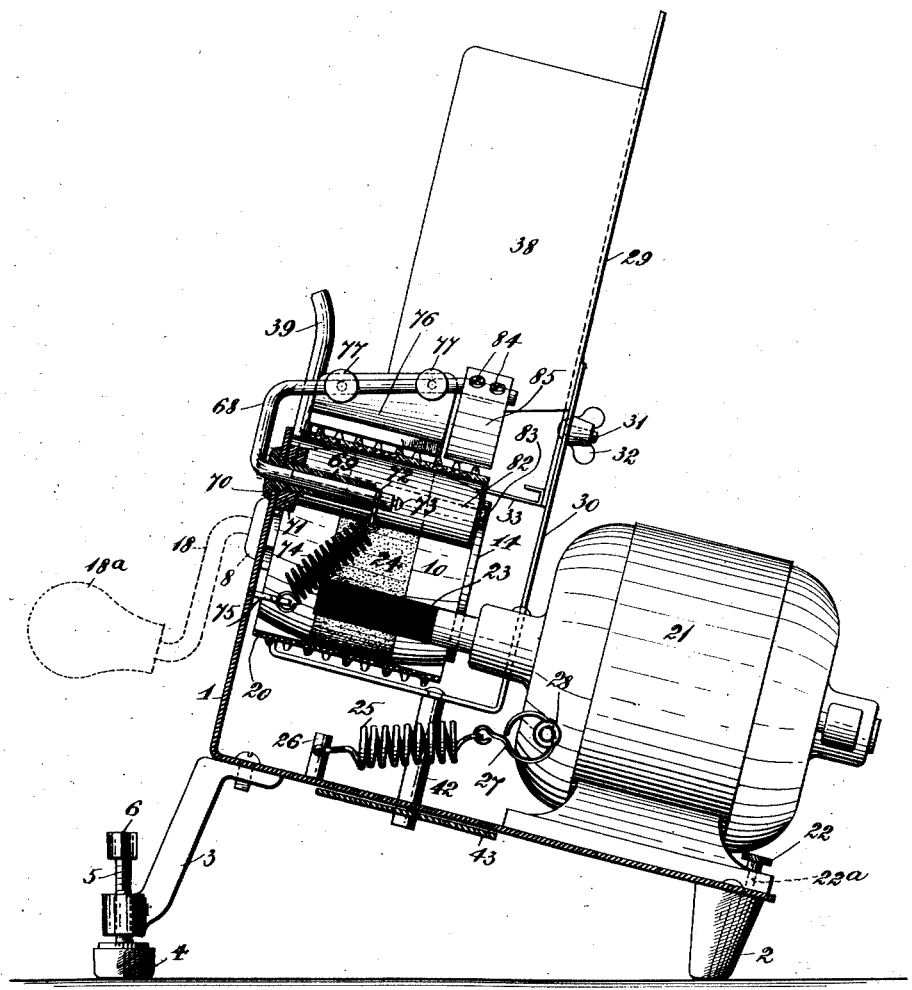
Fig. 3 is a cross-sectional view on line 3—3 of Fig. 1, viewed in the direction of the arrow.

To insure separation of envelops from the stack in feed-hopper 29 and to insure their accurate passage over feed-belt 20 and to open their flaps and moisten the gummed surfaces thereof I have provided the following described means: A crooked arm 68 (see Fig. 3) extends in a substantially vertical position over feed-belt 20 which is in a sidewise slanting position. This arm 68 passes through a hole in frame 1 near the top of the side thereof being mounted in said hole by passing through a bushing 69 which has a flange 70 to engage the exterior of frame 1. A nut 71 screwed upon bushing 69 and against the inner side of frame 1 holds the bushing firmly in place. The lower end of arm 68 projects beyond bushing 69 and has a pin 72 fastened in a hole therein by means of screw 73. A coil spring 74 is fastened at one end to pin 72 and at the other end to pin 75 which is screwed into the side of frame 1. The spring 74 tends to actuate the upper part of arm 68 downwardly by tending to rotate the arm in bushing 69. A rectangular rubber stripper 76 is fastened to arm 68 by means of thumb screws 77 which pass through holes in arm 68 and enter threaded holes in a metallic strip 78 which is embedded in the rubber stripper 76. This rubber stripper 76 has fastened on the lower end thereof a metallic tip 79 (see Figs. 9 and 10) which is provided with a beveled inner side 80 which is provided with holes 81 so that this tip may be fastened by molding the rubber about the beveled inner side thereof and forcing it through said holes 81. The downward stress of arm 68 will cause one side of the rubber stripper to bear firmly against the feed-belt 20 and be flexed so that the metallic tip 79 bears with its flat under side against the feed-belt 20 while the rubber portion of the stripper is bent in a curve which is more abrupt on the side nearer the upper edge of the feed-belt 20 where there is less space between arm 68 and the slanting belt than there is between said arm 68 and the lower part of the belt. Hence the stripper has a broader bearing on the belt on this side.

In order that the pressure of stripper 76 may not depress that part of feed-belt 20 whereon it bears and thus force the top of the belt out of alinement the belt is supported at that point by roller 82 which has a journal 83 fastened to the side of frame 1. The outer end of arm 68 is bent downward substantially parallel with the surface of the feed-belt 20 and has fastened thereto by means of screws 84 a long flat and flexible metallic presser-spring 85 which bears upon the surface of the feed-belt next the lower edge thereof for a considerable distance. The functions of the rubber stripper 76 and this presser-spring 85 will be later explained.

The flap lifter consists of plate 86 which extends over feed-belt 20 in a substantially horizontal position this plate 86 being loosely mounted on ears 87 of bracket 88 which ears pass through holes in said plate. Plate 86 has a downwardly extending lug 89 against which bears a screw 90 which passes through bracket 88. By turning screw 90 plate 86 will be elevated or lowered so that its downwardly extending fin 91 will bear more lightly or heavily upon the feed-belt as may be found desirable. From Fig. 12 the peculiar shape of fin 91 will be observed, it being there shown that the edge 92 of the fin first slants rearwardly and toward the rubber stripper 76, there being a space between the rearward portion of the fin and the feed-belt as the feed-belt is slantingly disposed. There is also a space between the feed-belt 20 and the plate 86 permitting tank 93 to be mounted beneath plate 86, the plate forming the top of the tank. In an aperture 94 in the plate 86 is mounted the moistening roller 95 which is shaped like the frustum of a cone the smaller portions being nearest the extremity of plate 86. The roller 95 turns on a spindle 96 which is suitably journaled in lugs 97 and 98 on plate 86. Thus the top of roller 95 extends above the top of plate 86 while the bottom of the roller runs in water contained in the tank 93, which water is replenished from reservoir 99 which is preferably made of glass and provided with a downwardly extending neck or spout 100 which enters the tank 93 at a point at the desired water level of the tank. The reservoir 99 rests upon an annular boss 101 which embraces spout 100 and is mounted above a hole in plate 86. For the purposes of preventing water in the reservoir 99 from flowing out prematurely when the reservoir is inverted in the act of inserting the spout 100 in the annular boss 101 a valve 102 is provided. This is made of rubber and fastened to valve stem 103 which projects at one end below the end of spout 100 and at the other end enters freely and slides within a recess 104 in the top of reservoir 99. A coil spring 105 embraces the valve stem and contacts at one end with the interior of the top of the reservoir 99 near the recess 104, and at the other end with the top of the valve 102 thus normally retaining the valve in a seated position so as to close spout 100. The contact of the lower end of the valve stem 103 with the base of tank 93 will lift the valve stem 103 and unseat valve 102 thus permitting the water in reservoir 99 to flow into tank 93 until the water level therein closes the end of spout 100.

To insure the proper contact of the gummed surface of the envelop flaps with the moistening roller 95 I have provided an arm 106 which overlies plate 86 and extends beside moistener roller 95 on the side toward which the envelops approach it. The outer end of arm 106 curves upwardly to insure the passage of the envelop flaps beneath it and the other end is bent sharply and loosely mounted in holes in lugs 107 and 108 on plate 86 so that arm 106 may swing upwardly to permit the easy passage of the envelop flaps beneath it. I have found that if the arm 106 bears too heavily upon the envelop flaps it will cause them to press so firmly against the moistening roller 95 during their passage over said roller that water which would otherwise remain on the gummed surface of the flaps is squeezed off, therefore, I have provided means for limiting the extent of downward movement of arm 106 so that it may not press the envelop flaps so firmly against the moistening roller 95. This means consists of a thumb screw 109 passing through a threaded hole in said arm 106 which thumb screw is retained in position by a locking spring 110. By turning up this screw 109 the contact thereof with the top of plate 86 will elevate said arm so that it will press the envelop flap less firmly against the moistening roller 95.

Adjustability of the bracket 88 on which the flap opening and moistening means are mounted, so that their position in respect to the feed-belt 20 may be varied laterally, is provided by means of a slot 111 (see Fig. 4) in the base of said bracket through which slot pass screws 112 and 113 fast in the base of frame 1. Wing nuts 114 and 115 threaded to turn upon said screws are arranged to bind said bracket 88 firmly to the base of frame 1 in the desired position. As the bracket 88 rests on a base which slants parallel to the slant of feed-belt 20, movement of the bracket 88 will not materially change the bearing of fin 91 upon the feed-belt.

The operation of the machine is as follows:—A stack of envelops is placed in the feed-hopper 29 (see Fig. 11) face downward with the flap sides uppermost, the flaps being nearest the arm 39. The position of the triangular member 35 is then adjusted so that the rear part of the stack will be elevated and its forward end will engage the front wall 38 of the feed-hopper. The handle 46 is then rotated so as to move the feed-hopper 29 laterally and adjust the space between the side wall of feed hopper 29 and the arm 39 to conform to the width of the envelops in the stack. Incidentally the position of the receiving-hopper 60 is correspondingly adjusted laterally. Its position may also be adjusted longitudinally so as to move it toward or away from the end of feed-belt 20, to accommodate the particular length of envelop to be received, by sliding the receiving-hopper upon rod 57 which passes between the rear of the back wall 59 of the receiving hopper and the bracket 61 mounted thereon as described. It will be noted that the forward end of the stack of envelops rests upon the feed-belt 20. As the belt is now moved by the rotation of handle 18ª, or by starting the electric motor 21, the undermost envelop in the stack will be moved forward, the feed belt acting as a conveyer, passing under the forward end 38 of the feed-hopper, engaging and passing under the rubber stripper 76 which yields upwardly to allow this envelop to pass, the smooth metallic tip 79 thereof pressing the envelop into firm frictional feeding engagement with the feed-belt but not retarding it while the upwardly extending rubber portion of the stripper contacts with and retards the few envelops immediately above the lowermost one which has, by frictional engagement therewith been drawn under the forward end 38 of the feed-hopper. It has been explained that the rubber portion of stripper 76 is bent in a curve which is more abrupt on the side nearer the upper edge of the feed-belt 20. The result is that the rearward edge of that portion of the stripper which bears against the feed-belt, is diagonal, slanting forward toward the lower side of the belt. This causes the envelop flap to be wiped by the flat under surface of the stripper downward and away from the folded edge thereof, that part of the stripper lying nearest the crease of the envelop flap contacting therewith in advance of the more remote portions of the stripper overlying the lower part of the flap, thus preventing dislocation of the flap by the formation of a new crease therein. This function of preventing the dislocation of the flap, as by the formation of a new fold, which usually causes the flap to spring away from the body of the envelop, is of great importance in the subsequent operation of the machine as a dislocated flap will not get proper contact with the moistening means and tends to resist the sealing influence later described. Thus it will be seen that the rubber stripper, which has by reason of its retarding grip upon the envelop a tendency to dislocate the flap on which it bears, has also, by virtue of its peculiar construction, a flap positioning influence which assures the retention of the flap in its normal folded position. The metallic tip 79 of the rubber stripper 76 is designed to afford a minimum of retarding influence upon the envelop while holding it in firm engagement with the feed-belt.

As the envelop continues to move forward it passes under that part of the fin 91 which lies above the lower side of the slanting feed-belt and gradually contacts with the slanting edge 92 of the fin thus slightly elevating the fin and plate 86 as the fin rides upon the back of the envelop and becomes inserted between the envelop and the flap thereof thus causing the flap to pass over the fin and under arm 106 which presses the gummed under side of the flap against the moistening roller 95 thereby moistening it. The envelops are thus successively fed forward, one following closely after another, and their flaps opened and moistened. As the envelops pass under the flap-lifting and moistening means any tendency which this element may have to throw the envelop out of proper alinement is restrained by presser spring 85 which holds the envelop firmly against the feed-belt by bearing for a considerable portion of its length against the back thereof on the side opposite the point of contact of the flap lifting means, thus affording a counter friction to the friction of the flap lifting means. This presser spring also serves as a guide to direct the forward end of envelops, which are filled with bulky contents or which have a tendency to curl upward, beneath the flap opening and moistening means, thus preventing the forward edge of the envelop from riding over the fin 91 or improperly colliding therewith and choking the feed. The smooth metallic under surface of presser spring 85 does not retard the passage of the envelops. Should the envelop have a wide flap it may be desirable to move back the flap opening and moistening means by loosening wing nuts 114 and 115 and sliding back the bracket 88 whereon these means are mounted. If too much moisture is collected upon the gummed surfaces of the envelop flaps the rod 106 may be lowered by turning back thumb screw 109 so as to cause the water to be squeezed off by the increased pressure of the flap against roller 95. If the water tank 93 has a tendency to overflow around the moistening roller 95 it may be tilted back by turning threaded posts 5 in legs 3 so as to elevate that side of the machine.

As the envelops pass out from under the flap opening and moistening elements they drop into receiveing-hopper 60 and are stacked therein, the weight of the stack sealing all but a few of the uppermost envelops which may be further sealed by the hand of the operator who, to remove the stack, seizes it between his thumb and fingers, the bottom of the hopper being cut away at 64 for this purpose. The stack when removed should then be turned over so that the uppermost envelops are now underneath and may be sealed by the weight of those on top.

I am aware that it has been the common practice to provide means intended to positively seal the envelop flaps by pressing the moistened flap against the back of the envelop as it passes through the machine. This has been accomplished by means of passing the envelop beneath a sealing plate or between opposed sealing rollers, I have found, however, that such means may be eliminated as a brief interval of sealing pressure, as when the envelop is passing through the machine, is never sufficient to effectively seal the flap, there being required for this purpose a more prolonged contact between the gummed flap of the envelop and the back thereof in order that the moistened gum may be afforded an opportunity to penetrate the paper and dry. Hence I have provided for actual sealing in the receiving-hopper where the envelops are stacked with moistened flaps for a sufficient interval to permit the weight of the stack to hold the flaps in engagement with the backs of the envelops until the latter are effectively sealed. This is a matter of a few seconds while the stack is forming but this interval of sealing pressure is many times longer than that required to pass the envelops under a sealing plate or between sealing rollers as they progress through the machine. By eliminating the sealing plate or rollers usually located between the moistener and receiving hopper and placing the receiving hopper immediately adjacent the moistening means without sealing means intervening, I have eliminated a prolific source of trouble with the envelop sealing machine as such devices, because of their squeezing effect, force the water and gum out from the edges of the flap and spread them upon the back of the envelop thus causing the mechanism to become fouled with gum so that frequent cleaning is necessary. Also, if the envelops are later stacked before the gum exposed on the backs thereof is dried the envelops will stick together. Moreover, if the envelop contains hard and lumpy inclosures, such as metallic paper clips, these inclosures will be forced through the body of the envelop thereby mutilating it. The sealing rollers also have the fault of dislocating the flap of the envelop particularly if it is filled with bulky inclosures. By my elimination of such sealing devices I have eliminated these troubles. I have also made a shorter, more compact and more cheaply manufactured machine.

When it is desired to use my device with the electric motor in operation it is preferable to remove the crank 18 by unscrewing it.

It will be noted that since the rollers 10 whereon the feed-belt 20 is mounted are supported only on one end, the other end being freely accessible, it is thereby easily possible to slip the belt off for replacement should it become stretched or worn.

Having thus fully described my invention what I claim is—

1. In a device of the character specified the combination of a feed-hopper adapted to receive a stack of envelops, a conveyer arranged to contact with the lowermost envelop in said stack and forward said envelop, a rubber stripper arranged to bear partly on said conveyer, and means whereon said stripper is mounted whereby it is flexed, one side thereof being flexed more abruptly than the other side and having consequently a broader bearing on said conveyer for the purposes specified.

2. In a device of the character specified the combination of a feed-hopper adapted to receive a stack of envelops, a conveyer arranged to contact with the lowermost envelop in said stack and forward said envelop, a rubber stripper provided with a metallic tip, said stripper being arranged to bear partly on said conveyer and means whereon said stripper is mounted whereby it is flexed, one side thereof being flexed more abruptly than the other side and having consequently a broader bearing on said conveyer for the purposes specified.

3. In a device of the character specified the combination of a feed-hopper adapted to receive a stack of envelops, a conveyer arranged to contact with the lowermost envelop of said stack and forward said envelop, a stripper adapted to permit the passage of said lowermost envelop from said stack while retarding those above it, a flap-opening means, a flap-moistening means and an elongated presser-spring arranged to guide the envelop beneath said flap-opening means.

4. In a device of the character specified the combination of a feed-hopper adapted to receive a stack of envelops, a conveyer arranged to contact with the lowermost envelop of said stack and forward said envelop, a stripper adapted to permit the passage of said lowermost envelop from said stack while retarding those above it, a flap-opening means extending substantially across said conveyer and arranged to contact with one side of an envelop forwarded thereby, a flap-moistening means, and an elongated presser spring arranged to guide the envelop beneath said flap-opening means and to bear upon the side of the envelop opposite from that on which said flap-opening means contacts for the purpose specified.

5. In a device of the character specified the combination of a conveyer, a combined flap-opening and flap-moistening means so mounted as to extend partly across said conveyer and means whereby said flap-opening and flap-moistening means are adjustably mounted with respect to elevation.

6. In a device of the character specified, the combination of a conveyer, a combined flap-opening and flap-moistening means so mounted as to extend partly across said conveyer, means whereby said flap-opening and flap-moistening means are slidably mounted on a support parallel to the surface of said conveyer in a manner whereby their positions may be adjusted laterally with respect to said conveyer, and means whereby said flap-opening and flap-moistening means are adjustably mounted with respect to elevation.

7. In a device of the character specified, the combination of a flap-opening means, a flap-moistening means, a rod adapted to yieldingly press the flap of said envelop against said moistening means and means for adjusting the normal position of said rod with respect to said moistening means.

8. In a device of the character specified, the combination of a conveyer, a feed-hopper adapted to receive a stack of envelops located at one side of the conveyer, a stripper located above the conveyer to cause the envelops to be forwarded successively thereon, a flap-opening means and a flap-moistening means located over the conveyer, and a receiving-hopper for the moistened envelops located on the side of the conveyer opposite to said feed-hopper and adjustable toward and from said conveyer and laterally with relation thereto.

9. In a device of the character specified the combination of a feed-hopper, means for feeding envelops successively from a stack in said feed-hopper, means for opening and moistening the flaps of said envelops, a receiving-hopper, means connecting said feed-hopper and said receiving-hopper, and means for actuating said connecting means in a manner whereby the positions of said feed-hopper and said receiving-hopper may be adjusted laterally to a corresponding extent.

10. In a device of the character specified the combination of a feeding means to support and forward the envelops to be operated upon, a flap moistening means and a receiver located immediately adjacent to said flap moistening means to collect the envelops successively in a self-sealing stack for the purpose specified.

11. In a device of the character specified the combination of a conveyer to support and feed the envelops to be operated upon, a holder for a plurality of envelops located at one side of said conveyer, a stripper to separate the envelops and cause them to be fed successively upon said conveyer, a flap-opening member and a flap-moistening member located over said conveyer, and a receiver located on the other side of said conveyer immediately adjacent to said flap-moistening member to collect the envelops successively in a self-sealing stack for the purpose specified.

In witness whereof I have hereunto affixed my signature.

FREDERICK W. STORCK.